(12) United States Patent
Wakayama et al.

(10) Patent No.: US 8,104,717 B2
(45) Date of Patent: Jan. 31, 2012

(54) AIR TRANSPORT WITH SCALLOPED UNDERBODY

(75) Inventors: Sean R. Wakayama, Stanton, CA (US); Richard C. Odle, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 401 days.

(21) Appl. No.: 11/614,052

(22) Filed: Dec. 20, 2006

(65) Prior Publication Data

US 2008/0149763 A1 Jun. 26, 2008

(51) Int. Cl.
*B64D 1/12* (2006.01)
(52) U.S. Cl. .................... 244/137.4; 244/137.1
(58) Field of Classification Search .......... 244/2, 117 R, 244/118.2, 137.1, 137.4
See application file for complete search history.

(56) References Cited

U.S. PATENT DOCUMENTS

| | | | | |
|---|---|---|---|---|
| 1,774,414 A | * | 8/1930 | Bleriot | 244/2 |
| 2,387,527 A | * | 10/1945 | Nagamatsu | 244/118.2 |
| 2,399,217 A | * | 4/1946 | Fahrney | 244/2 |
| 2,448,862 A | * | 9/1948 | Conklin | 244/118.2 |
| 2,472,947 A | * | 6/1949 | Hlobil | 244/118.1 |
| 2,683,005 A | * | 7/1954 | Frost | 244/118.2 |
| 2,780,422 A | * | 2/1957 | Maglio, Jr. | 244/2 |
| 2,900,874 A | * | 8/1959 | Tjossem | 89/1.815 |
| 4,802,641 A | * | 2/1989 | Hardy et al. | 244/137.4 |
| 6,554,227 B2 | * | 4/2003 | Wolter | 244/140 |
| 6,923,403 B1 | * | 8/2005 | Dizdarevic et al. | 244/13 |
| 6,966,524 B2 | * | 11/2005 | Stuhr | 244/53 B |

OTHER PUBLICATIONS

Bottom of an F4 aircraft with missile indentations: http://www.projectoceanvision.com/vox/images/chapter06/f-4-phantom_q_fit.jpg; accessed Aug. 26, 2011.
Conformal Fuel Tanks on F-15 aircraft: http://en.wikipedia.org/wiki/File:F-15E_CFT.jpg: accessed Aug. 26, 2011.

* cited by examiner

*Primary Examiner* — Tien Dinh
*Assistant Examiner* — Philip J Bonzell
(74) *Attorney, Agent, or Firm* — Hope Baldauff Hartman, LLC

(57) ABSTRACT

An exemplary embodiment provides an air transport that has a scalloped aerodynamic underside that includes at least one depression. The depression is configured to receive at least an upper portion of a cargo pod to preclude an air passage way between an upper surface of a pod and the scalloped underside of the transport. Certain embodiments provide conformal pods that nest into the depressions so that pod under surfaces blend smoothly with the scalloped underside of the transport to provide a smooth aerodynamic underside. The scalloped underside may be retrofitted to existing aircraft or supplied as original equipment on new transports, and may be of composite, plastic or other light weight materials.

9 Claims, 6 Drawing Sheets

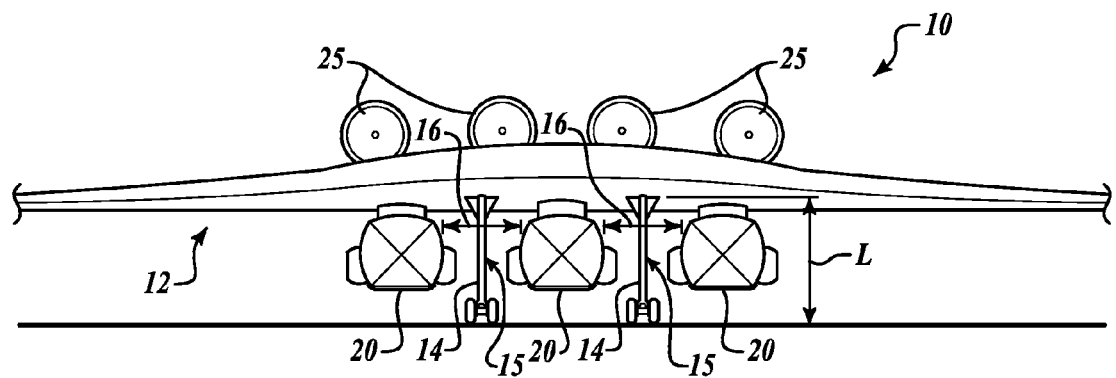
FIG. 1 *(PRIOR ART)*
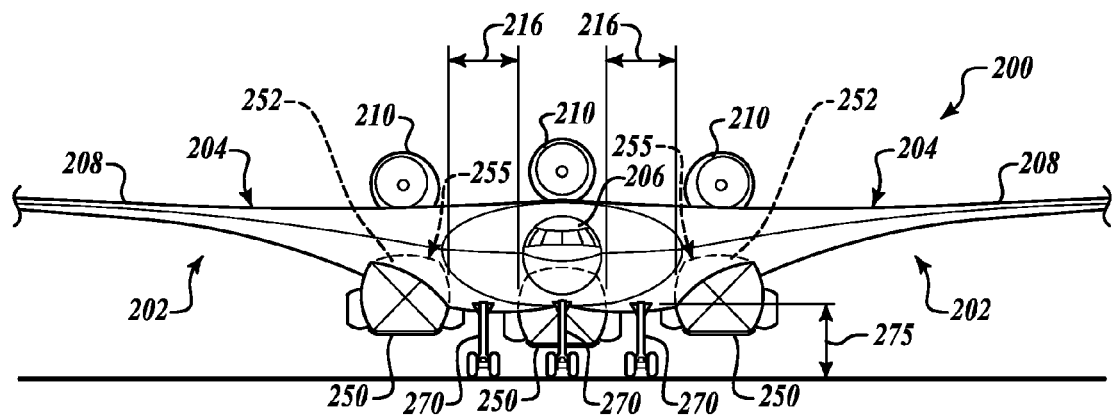
FIG. 2A

AIR TRANSPORT WITH SCALLOPED UNDERBODY

STATEMENT REGARDING FEDERALLY SPONSORED RESEARCH OR DEVELOPMENT

The U.S. Government has a paid-up license for this subject matter and the right in limited circumstances to require the patent owner to license others on reasonable terms as provided by the terms of contract No. CRADA 03-334-ASC-01.

TECHNICAL FIELD

The embodiments described herein generally relate to air transports, and more particularly relate to air transports that carry cargo pods.

BACKGROUND

One of the issues that recur in air transportation is how to transport a large number of different payloads in the minimum amount of time and at the lowest cost. These payloads may include capital equipment such as heavy mechanical devices and components, pallets of supplies, vehicles, and the like as well as personnel, in some cases. When a fleet of vehicles is used to carry the payloads, each vehicle carries payloads on multiple trips in order for the fleet to transport all of the payloads. The time to transport all these payloads is affected by the number of vehicles in the fleet and the time it takes for each trip. To reduce the cost of transportation, there are a few fundamental approaches. These include reducing the cost of fuel burned, reducing the cost of the vehicles, and increasing the utilization of each vehicle to reduce the number of vehicles required.

Increasing utilization is accomplished by reducing the total time to complete a trip. This includes reducing total time which includes time to travel from point of origin to destination, time maintaining the vehicle, and time for loading and unloading the payload. Reducing the time spent loading and unloading the payload is addressed by using detachable cargo pods that can be loaded and ready before the aircraft is scheduled to fly. When the aircraft is ready, the cargo pods are attached to the aircraft.

Since attaching and detaching the cargo pod takes less time than loading and unloading the cargo, the aircraft spends less time loading and unloading the payload and therefore achieves higher utilization. Higher utilization and reduced cargo handling cost reduces the cost of transportation.

While increased utilization and reduced vehicle cost are significant benefits of using cargo pods, there are also some drawbacks. For example, referring to FIG. 1, the aircraft 10, with four engines 25 in this case, has three cargo pods 20 attached to the relatively flat undersurface 12 of the aircraft 10. The pods 20 are laterally separated and the aircraft landing gear 14 is housed and deployed in the lateral gaps 16 between pods 20. The pods 20 are tall in order to allow carrying of standard containers and large cargo, like vehicles for example. Because the landing gear 14 must extend beyond the full height of the pods 20, the landing gear 14 are also tall, having a length L, measured from a point of attachment to the aircraft to the ground, as shown.

In general, as the length L of the landing gear 14 increases, it becomes heavier. This is because forces generated during ordinary use of the aircraft, such as braking and turning, generate loads transverse to the landing gear strut 15 which result in bending moments on the strut 15. These bending moments are proportional to the force times the length of the strut. Accordingly, longer landing gear experience larger bending moments. To cope with these larger bending moments, more structural cross sectional area is required in the landing gear strut 15. This adds weight. In addition to bending, the strut 15 must be sized to avoid buckling. As strut length increases, larger structural cross sections, which are heavier, are required to avoid the risk of buckling. With heavier landing gear structure, larger actuators will also be required. All these factors adverse impact weight, cost, and required power.

Aerodynamic drag from the pods poses an issue with regard to fuel consumption and aircraft range. Typically, the pods are separated laterally as in FIG. 1 in order to house and deploy landing gear in the gaps between the pods. The landing gear must be deployed between pods in order to keep a reasonable landing gear track, which is the lateral distance between the outer edges of the main landing gear. If the spacing is too wide, the aircraft will not be compatible with runway and taxiway widths. While part of the upper surface of each pod is covered because of the attachment to the aircraft, the other pod surfaces are exposed. But for the issue with landing gear track, the pods could be designed to fit snugly against each other to cover the surface area on the side of the pods. When the aircraft is flying, air passing over the exposed surfaces generates skin friction and creates aerodynamic drag, in the direction opposite the motion of the aircraft. To maintain steady state flight, the drag force must be countered by force ("thrust") acting in the direction of the motion of the aircraft. Because an engine is used to generate thrust, and the engine burns fuel to generate thrust, more fuel must be burned to sustain greater thrust. So, it is desirable to reduce drag to reduce thrust and the cost of fuel burned. Skin friction drag increases with increasing surface area exposed to the surrounding air flow. Thus, the larger the exposed area the greater the drag. In addition, the pods force the air to accelerate around them. In the passage ways between the pods and between the pods and the aircraft body, there is narrowing in the cross sectional area (air passage ways) available for air to flow through. The air is therefore forced to accelerate and flow faster to get through the narrowed passage ways. The increased air speed increases skin friction drag. It also increases the risk that shocks might form at high subsonic speed. Shocks create drag by dissipating energy in the air, which results in reduced downstream pressures that essentially create suction on the back end of the aircraft that must be overcome with thrust. The acceleration of airflow around the pods also results in increased drag.

Accordingly, there is a need to reduce the amount of surface area on the pods exposed during flight, and to eliminate or reduce narrow air flow passage ways, consistent with maintaining payload volume. Further, there is a need to shorten the landing gear and reduce its weight. Furthermore, other desirable features and characteristics of the configurable air transport with scalloped underbody, described herein below, will become apparent from the subsequent detailed description and the appended claims, taken in conjunction with the accompanying drawings and the foregoing technical field and background.

BRIEF SUMMARY

An exemplary embodiment provides an air transport that has a scalloped aerodynamic shape or curvature that includes at least one depression. The depression is configured to receive at least an upper portion of a cargo pod to preclude an air passage way between an upper surface of a pod and a scalloped underside of the transport.

Another exemplary embodiment provides an air transport that has an aerodynamic shape that includes an aerodynamic scalloped underside. The scalloped underside has at least one longitudinally extending depression configured to receive at least an upper portion of a cargo pod. The transport has landing gear configured for stowing within a landing gear compartment comprising landing gear compartment doors. Exterior surfaces of the landing gear compartment doors are co-extensive with and blend smoothly with aerodynamic curvature of the scalloped underside, when the doors are closed.

A further exemplary embodiment of an air transport has an aerodynamic shape with a scalloped underside that has at least two longitudinally extending depressions. The depressions are configured to receive an upper portion of a cargo pod to thereby preclude an air passage way between an upper surface of a pod and the scalloped underside of the transport. Further, the landing gear of the transport is configured for stowing within a landing gear compartment that has landing gear compartment doors that are co-extensive with and blend smoothly with aerodynamic curvature of the scalloped underside. The landing gear has length based upon factors that include the extent to which cargo pods may be inserted into the depressions, i.e. based on the depth of the depressions.

BRIEF DESCRIPTION OF THE DRAWINGS

Various embodiments will hereinafter be described in conjunction with the following drawing figures, wherein like numerals denote like elements, and FIG. 1 illustrates a prior art aircraft adapted to carry cargo pods;

FIG. 2A illustrates a front view of an exemplary embodiment of an air transport with scalloped underbody and shorter landing gear;

DETAILED DESCRIPTION

Figure 2B:
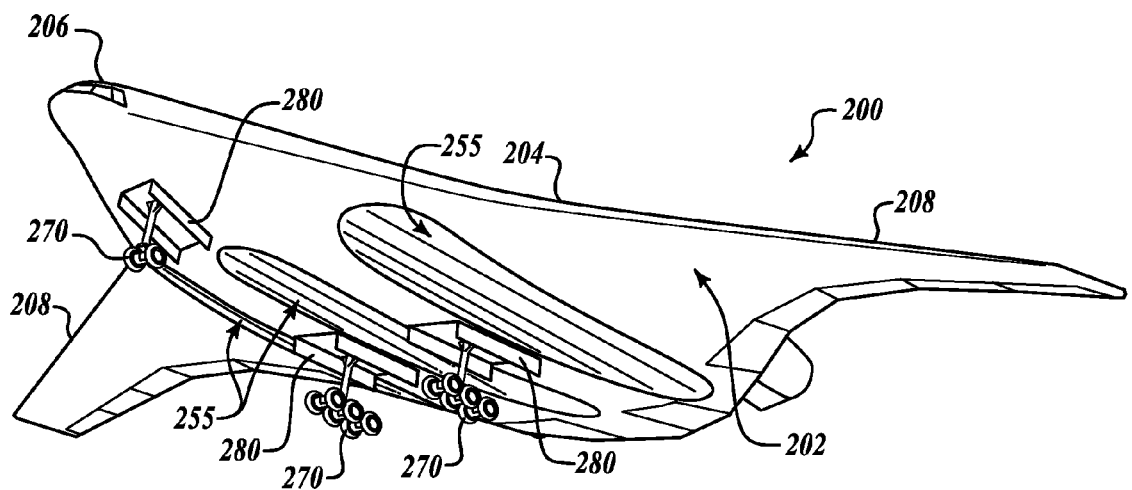
FIG. 2B illustrates a perspective view and especially the underside of the embodiment of FIG. 2A with no pods and with landing gear extended.
Figure 2C:
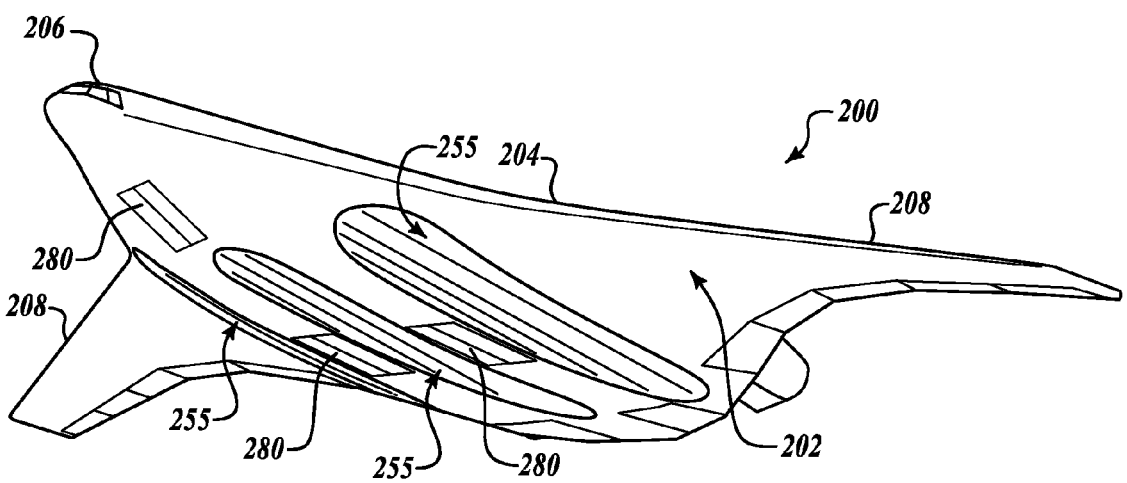
FIG. 2C illustrates a perspective view and especially the underside of the embodiment of FIG. 2A with no pods and with landing gear stowed.

The following detailed description is merely exemplary in nature and is not intended to limit the described embodiments or the application and uses of the described embodiments. Furthermore, there is no intention to be bound by any expressed or implied theory presented in the preceding technical field, background, brief summary or the following detailed description.

Embodiments of the configurable air transport include a scalloped underbody that reduces drag by submerging at least some portion of the surface area of the cargo pods that would otherwise be exposed, in the aerodynamic shape of the transport. The scalloped underbody is aerodynamically smooth but includes depressions in its outer surface configured to register with and receive cargo pods that nest snugly within the depressions. As a result, narrow passage ways created in prior art transports, between pods loaded to the transport and between the pods and the transport body, are minimized or eliminated. Further, in exemplary embodiments, the scalloped underbody forms an aerodynamic fairing for stowing landing gear during flight. The aerodynamic landing gear compartment outer surface presents a smooth outer surface to air flow with resultant reduction in drag. The reduction in drag from the scalloped underbody improves fuel efficiency, reduce fuel burn, and reduce operational cost associated with fuel usage. In addition, while the pods may be secured to the transport at the same elevation as in other transports, the scalloped underbody extends the aerodynamic shape of the transport downward so that lower attachment points are available for the landing gear. Thus, to maintain the same required ground clearance beneath the pods, the downward extending scalloped underbody allows the use of shorter, lighter landing gear. The reduced landing gear size, and hence cost, primarily reduces acquisition cost, although there might also be some reduction in operational cost through reduced maintenance and spares cost. There should also be some fuel savings and/or payload increase due to a lighter landing gear.

The scalloped underbody aircraft reduce drag. For example, in embodiments of the scalloped underbody aircraft that have a reduction in exposed surface area of the pods of about 35%, surface area is reduced about 6% at the overall aircraft level. Based on an assumption that skin friction drag accounts for about half of the total drag in ideal conditions, the exposed surface area reduction results in about 3% lower drag. Typical cruise conditions tend to have more skin friction drag than the ideal case, so the drag reduction expected in flight is likely more than about 3%. This results in significant fuel savings.

Exemplary embodiments of the scalloped underbody may have one or more conformal fairings that extend outward smoothly from the aircraft belly. Each fairing is conformal to one, two or more detachable pods. The conformal fairings can blend with the aircraft aerofoil shape or can extend smoothly outward from the lower surface of the aerofoil. Accordingly, the conformal fairings reduce drag, through reducing the surface area over which air flows while the aircraft is in flight, by enveloping the entire surface area on the exterior of the detachable pods, except the undersurface.

Other exemplary embodiments include the use of detachable fairings, plugs, or conformal pods that may be attached to the transport underbody when a standard pod is not attached to the transport. These attachments reduce wetted surface area and thereby reduce drag as compared to the scalloped underbody absent the pods.

Embodiments of the conformal fairings can provide space for stowing landing gear. In addition, the conformal fairings can cover structure that supports landing gear. By extending smoothly outward below the aircraft belly, the conformal fairings allow a lower elevation for the attachment point of the landing gear thereby allowing shorter and lighter weight landing gear and backup airframe structure. Other exemplary embodiments of conformal fairings can allow the landing gear to be stowed outside of the main wing structure. This arrangement can reduce the number and size of cutouts in the main wing structure, resulting in reduced weight and complexity.

In one embodiment, illustrated in FIGS. 2A-E, an air transport 200, equipped with three engines 210 in this example, has a scalloped underbody 202 shaped to substantially conform to the curvature in three dimensions of a relatively thick aerodynamic shape 204 of the transport 200. The relatively thick aerodynamic shape 204 includes the shape of the fuselage 206 and the shape of the wings 208. The pods 250 are at least partially submerged into the aerodynamic shape 204. Accordingly, the narrow air passage ways of the prior art between the transport and upper surfaces of the pods are eliminated. However, the pods 250 extend, as discrete objects out from the aircraft underbody 202 and protrude outward from the aerodynamic shape 204 into the air flow. As a result, there are passage ways 216 between the pods 250. However, these are shallower passage ways 216 as compared to the prior art. Accordingly, the passage ways 216 offer better aerodynamics, i.e. reduced drag forces.

Figure 2D:
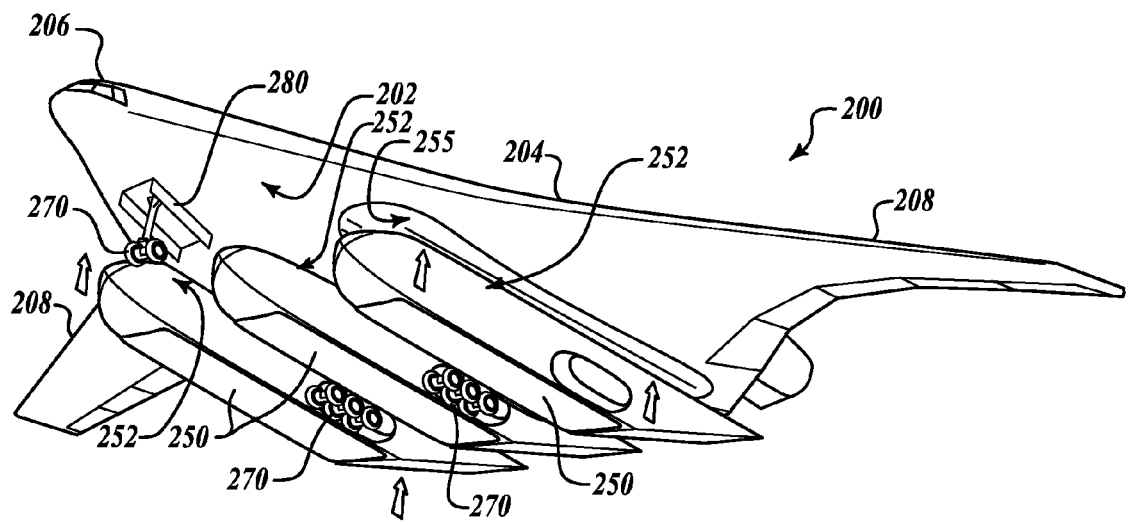
FIG. 2D illustrates a perspective view and especially the underside of the embodiment of FIG. 2A with pods and with landing gear extended.
Figure 2E:
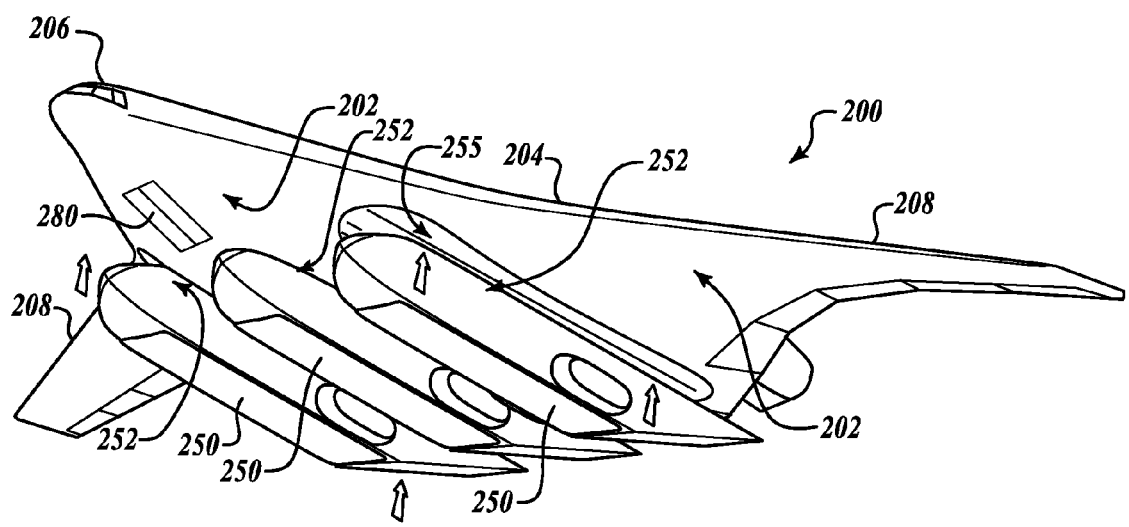
FIG. 2E illustrates a perspective view and especially the underside of the embodiment of FIG. 2A with pods and with landing gear retracted.

As shown more especially in FIGS. 2B and 2D-E, the pods 250 fit snugly into depressions 255 in the underside of the aerodynamic shape 204 that are configured to receive the pods 250 so that the pods 250 are at least partially submerged into the depressions 255. Further, the landing gear 270 stows into compartments (not shown) covered by landing gear compartment doors 280 (FIG. 2C) that have outer surfaces that conform to and blend smoothly with aerodynamic shape of the scalloped underbody 202 of aerodynamic shape 204. Accordingly, drag forces over the fairings of landing gear compartment doors 280 are minimized. FIG. 2D illustrates the transport 200 with landing gear 270 extended and shows how upper portions 252 of pods 250 are received into complimentary-shaped depressions 255. FIG. 2E illustrates the transport 200 with landing gear 270 stowed beneath smooth landing gear compartment door fairings 280 and shows how upper portions 252 of pods 250 are received into complimentary-shaped depressions 255. Thus when loaded, the upper portions 252 of pods 250 are integrated smoothly into the aerodynamic shape 204 to reduce drag forces. 255. Thus when loaded, the upper portions 252 of pods 250 are integrated smoothly into the aerodynamic shape 204 to reduce drag forces.

As can be seen in FIG. 2A, the landing gear height 275 (or landing gear length 275) is reduced from that of the prior art for a similar transport. Landing gear height reduction substantially correlates to the extent to which the pods 250 submerge into the aerodynamic shape 204. The greater the depth to which the upper portion 252 of pods 250 are submerged, the greater the potential reduction in landing gear height 275.

In general, the landing gear height reduction may be deduced by a formulation that takes into account several variables, including the depth of the pod-receiving depression 255, and the height of an attachment pylon, which is used in the prior art transports to secure the pods to the transport. In general, the landing gear height reduction may be estimated by reference to the height of the pod as the standard of reference for pylon height and depression depth. Thus, for example, if in the prior art the pylon height was about 13% of pod height, and if the depression 255 of an exemplary embodiment of a scalloped underbody transport were 33% of pod height, then the potential landing gear height reduction=13+33=46% of pod height. Using this example of a formulation, landing gear height may potentially be reduced by about 20% to 40% relative to prior art landing gear, depending upon the depth of the depression and the height of the pylon that would have been used in the prior art with the particular pod.

Figure 3A:
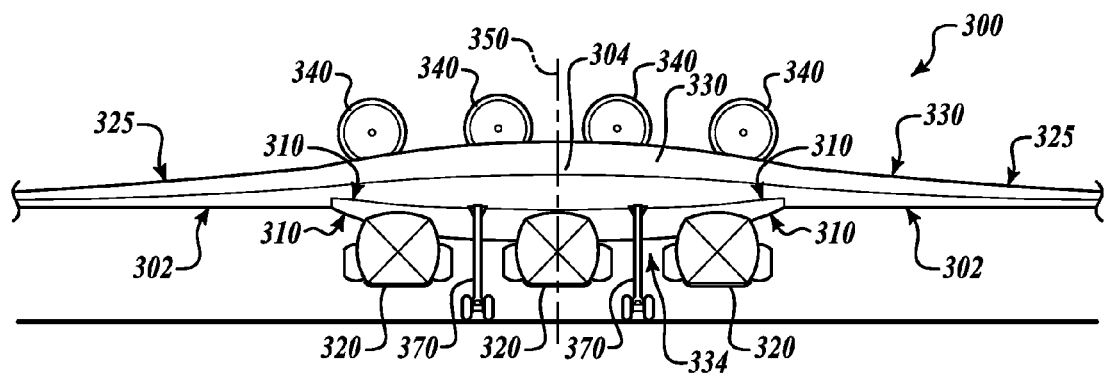
FIG. 3A illustrates an exemplary embodiment of a thin aerofoil transport in frontal view with pods attached and landing gear extended.
Figure 3B:
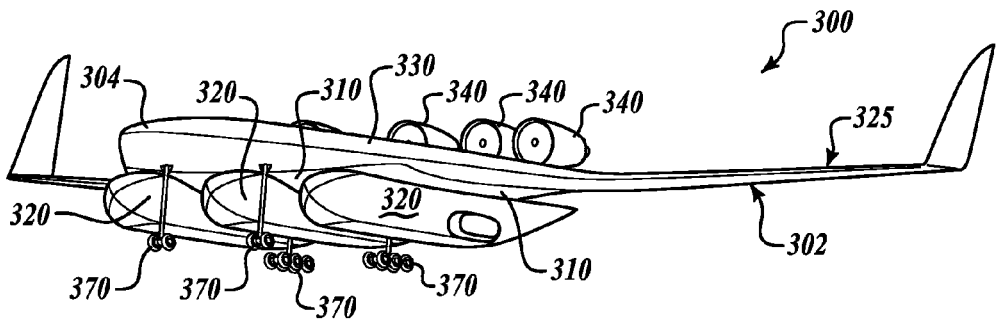
FIG. 3B is a perspective view of the embodiment of FIG. 3A.
Figure 3C:
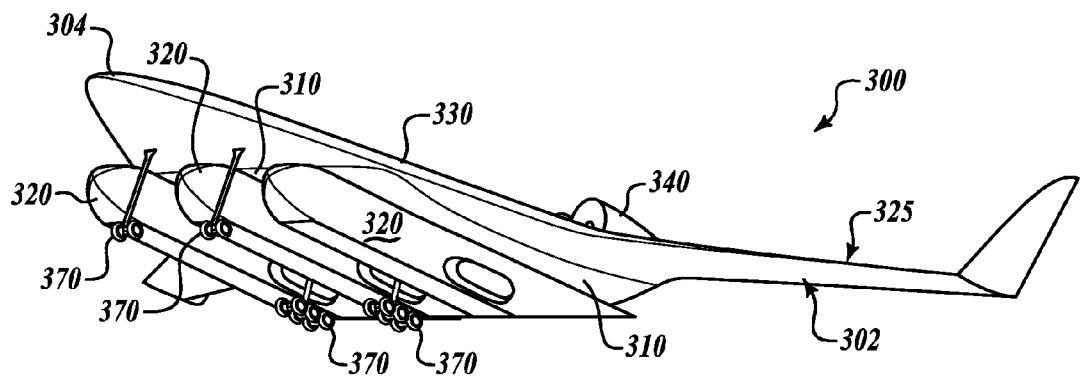
FIG. 3C is a perspective and underside view of the embodiment of FIG. 3A.

In another embodiment, illustrated in FIGS. 3A-C, a four-engined 340 transport 300 has a scalloped underbody that takes the form of a conformal fairing (extending between pairs of opposed arrows 310 in FIG. 3A). The transport 300 is of a "thin aerofoil" design and has an aerodynamic shape 330 that includes the shape of the fuselage 304 and shape of the wings 325. Thus, aerodynamic shape 330 is "thin" as compared to the example of a "thick" aerodynamic shape 204 of FIGS. 2A-E. As a result, merging a large proportion of the upper section of pods 320 into the aerodynamic shape 330 may not be possible, unless the pods are smaller than usual or of shallow design. Here, pods 320 protrude from the lower surface 302 of the wing 325. The conformal fairing 310, which may be of a composite material or other light weight structure, is configured to have an outer surface conforming to the curvature of and to blend smoothly into the underside 334 of aerodynamic shape 330 to reduce drag. The conformal fairing 310 extends laterally from the centerline 350 of the transport 300 in between the pods 320 and outward beyond the pods 320. The conformal fairing 310 blends smoothly with the underside of the wing 325 to form a low drag aerodynamically smooth surface beneath wing 325. This embodiment avoids creating a depression under the wing 325 that slopes away from the air flow, which may cause additional drag, when the pods 320 are detached, as may be the case for embodiments of FIGS. 2A-E. Here, also, the general formula given above may be used to estimate the possible reduction in the height of the landing gear 370, taking into account that the forward landing gear are not likely to be affected much, if at all, by the scalloped underbody which affects mainly the rear landing gear.

Figure 4A:
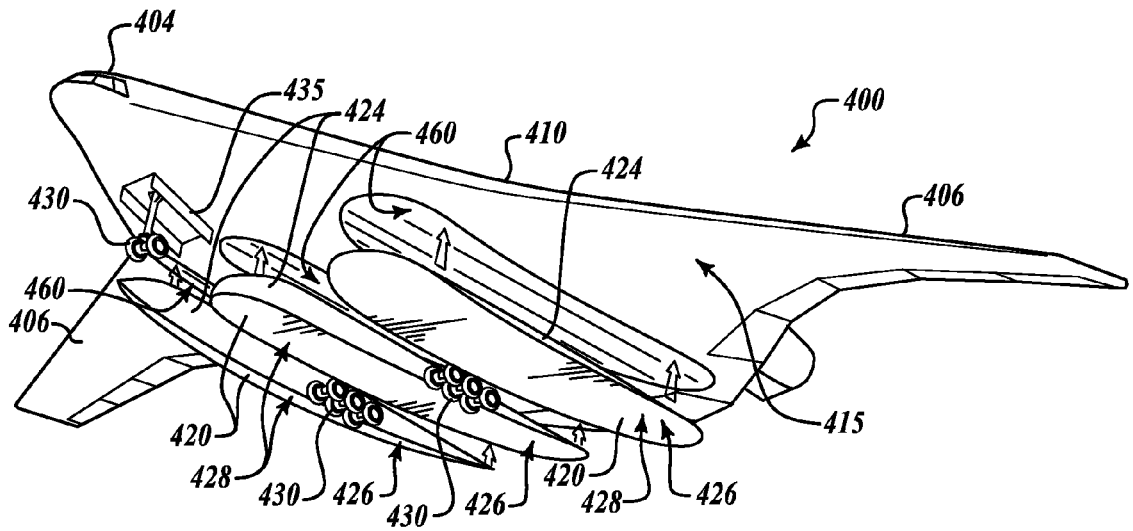
FIG. 4A illustrates a perspective frontal and underside view of an exemplary embodiment of a transport with conformal pods not yet loaded showing depressions for receiving the pods within a thick aerofoil.
Figure 4B:
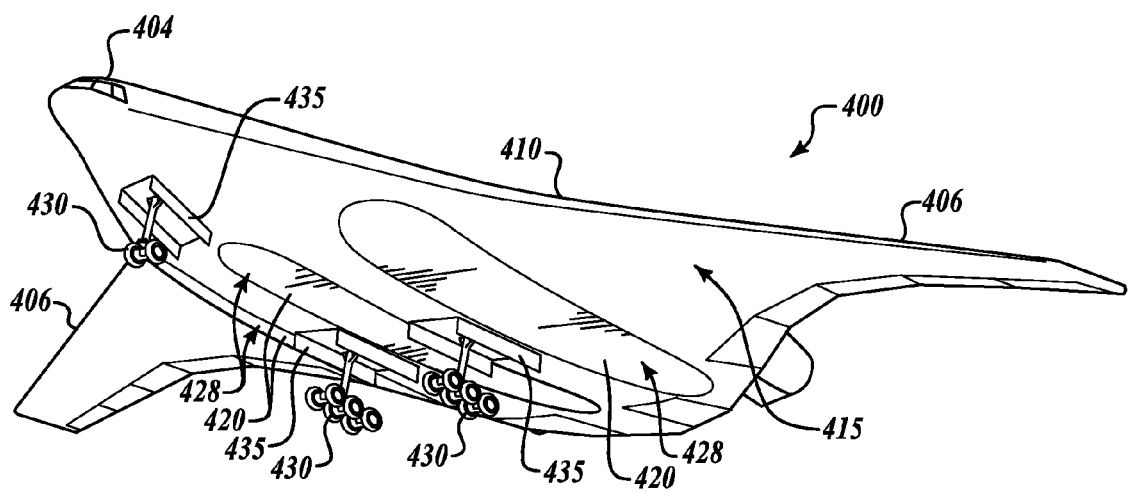
FIG. 4B illustrates a perspective frontal and underside view of an exemplary embodiment of a transport with conformal pods loaded and landing gear extended.
Figure 4C:
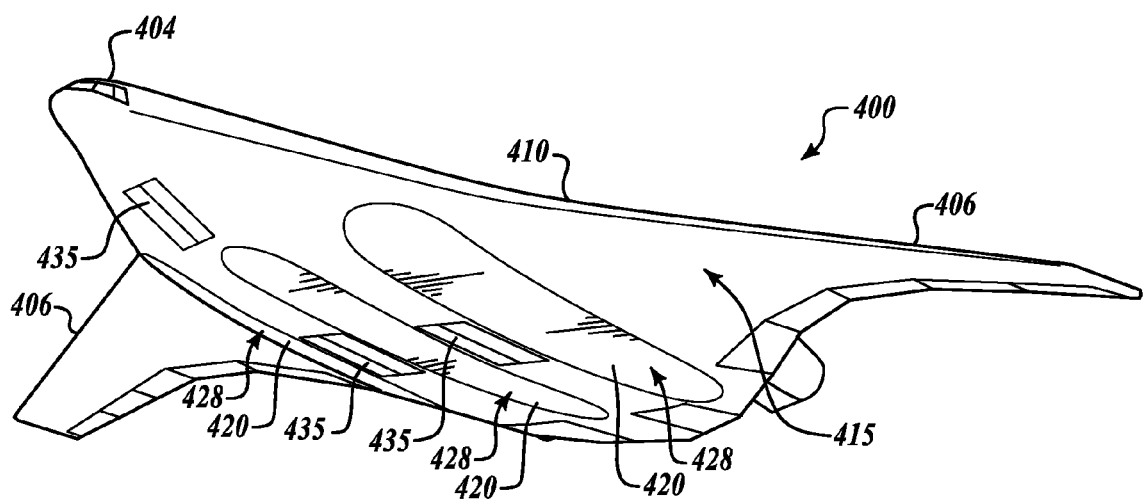
FIG. 4C illustrates a perspective frontal and underside view of an exemplary embodiment of a transport with conformal pods loaded and landing gear stowed.

Some embodiments use conformal aerodynamic pods instead of cargo pods. These conformal pods substantially restore the wing of a transport to its desired aerodynamic state maximizing aerodynamic performance. These conformal pods could be used for fuel, cargo, and payloads of all kinds. Detachable fairings or plugs can also be used to increase aerodynamic performance. For example, FIGS. 4A-C illustrate an air transport 400 equipped with conformal pods 420. The transport has an aerodynamic aircraft shape 410 that includes the shape of the fuselage 404, and shape of the wings 406. The pod depressions 460 (seen most clearly in FIG. 4A) in the aerodynamic aircraft shape 410 are shaped to conform to the entire upper portions 424 of the conformal pods 420. Thus, the conformal pods 420 register with and are snugly accommodated substantially entirely within the pod depressions 460. The lower portions 426 of the conformal pods 420 are shaped so that when the conformal pods are loaded to the transport 400 and the entire pod 420 fits within the pod depression 460, then the undersurfaces 428 of the conformal pods 420 are smoothly co-extensive with the undersurface 415 of the aerodynamic shape 410. Thus, the conformal pods 420 are integrated smoothly into the aerodynamic shape 410 and drag forces that arise from protrusions from the aerodynamic shape 410 are substantially or completely eliminated. Further, landing gear 430, shown extended in FIG. 4A-B and retracted in FIG. 4C, are stowed in landing gear compartments that have external landing gear compartment doors 435 that are shaped to be coextensive with and to blend smoothly with the curvature of the undersurface 415 of aerodynamic shape 410.

Since many embodiments of the shape of the scalloped underbody are not efficient for carrying wing bending, the main wing structure may pass above the scalloped underbody with a panel that is relatively flat and continuous. The scalloped underbody may have an outer skin and internal substructure. The internal substructure helps maintain the underbody shape and transmits major loads to the main wing structure. The underbody may connect to the main wing via mechanical attachments through the substructure. The internal substructure may also provide a point of attachment for the landing gear. Landing gear doors may integrate with the outer skin.

The scalloped underbodies may be installed on new transports or retrofitted to existing transports using composite, plastic or other light-weight panels that are suitably configured to provide the scalloped aerodynamic shape when attached to an underside of the transport.

Systems for handling the pods, such as winches intended to lift pods from ground level up to the height required for attachment may be submerged within the scalloped underbody. In certain embodiments, the mechanism for securing a detachable pod to the transport is contained beneath the underbody. The mechanism is ideally located external to the main wing structure and attaches to the underbody substructure, but other designs may be used. The main wing structure may require special components, such as structural ribs, to carry and distribute the loads from the pods. The scalloped underbody may have provisions to allow some systems to be connected between the aircraft and the detachable pods. To retain aerodynamic efficiency when pods are not attached, the underbody may contain doors and access panels to cover mechanisms and systems that connect to the pods.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. An air transport comprising:
a blended wing body having
a scalloped underside shaped to smoothly curve from an underside of a wing downward toward an underside of the fuselage and to smoothly curve upward from the underside of the fuselage to an underside of an opposite wing,
wherein the scalloped underside comprises at least one depression therein, the at least one depression having an outer surface to receive at least an upper portion and a front portion of a cargo pod so that when the cargo pod is loaded to the air transport and the at least the upper portion and front portion of the cargo pod is submerged within the at least one depression, the loaded cargo pod precludes an air passage way between an upper surface of the cargo pod and the scalloped underside of the air transport, and such that when the cargo pod is not loaded, the outer surface of the at least one depression provides an aerodynamic surface suitable for flight without an attached cargo pod.

2. The air transport of claim 1, wherein the at least one depression is sufficiently deep to receive a conformal cargo pod, the conformal cargo pod comprising a shape configured to nest within the at least one depression, and the conformal cargo pod having an underside surface shaped to blend smoothly with an aerodynamic curvature of the scalloped underside so as to minimize air flow disturbance around the conformal cargo pod, when it is loaded to the air transport.

3. The air transport of claim 1, comprising a thin aerofoil, and the scalloped underside comprises a removable conformal fairing attached to and extending laterally and longitudinally along an underside of the thin aerofoil, the conformal fairing extending laterally at least across a region for cargo pod attachment and the conformal fairing comprising the at least one depression for receiving the at least the upper portion of the cargo pod in the region for cargo pod attachment.

4. The air transport of claim 1, wherein the at least one depression extends longitudinally along the scalloped underside of the air transport.

5. The air transport of claim 4, wherein the at least one depression of the scalloped underside comprises three substantially parallel depressions configured to receive at least the upper portion of a cargo pod.

6. The air transport of claim 5, wherein the air transport comprises landing gear located on either side of a central one of the three substantially parallel depressions, the landing gear configured to extend from and to be stowed within landing gear compartments.

7. The air transport of claim 6, wherein the landing gear compartments comprise landing gear compartment doors, and the landing gear compartment doors have door exterior surfaces configured such that when the landing gear compartment doors close, the door exterior surfaces blend smoothly with an aerodynamic curvature of the scalloped underside to minimize air flow disturbance around the landing gear compartment doors.

8. An air transport, comprising:
A blended-wing body having a scalloped underside comprising a depression to receive at least an upper portion and a front portion of a cargo pod, the depression having a first edge, a second edge parallel to and opposite the first edge, and an arcuate outer surface that curves from the first edge to the second edge, forming an aerodynamic surface configured both for flight without an attached cargo pod and for receiving the upper portion and the front portion of the cargo pod.

9. An air transport system, comprising:
a blended-wing body having a scalloped underside and three parallel depressions formed into the scalloped underside, each depression having a first edge, a second edge parallel to and opposite the first edge, and an arcuate outer surface that curves from the first edge to the second edge, forming an aerodynamic surface configured both for flight without an attached cargo pod and for receiving an upper portion and a front portion of the attached cargo pod;
a cargo pod having an upper surface shaped to compliment the arcuate outer surface of each depression; and
a conformal pod configured to fit entirely within a depression when the cargo pod is not attached, the conformal pod comprising
an upper surface shaped to compliment the arcuate outer surface of the depression, and
a lower surface shaped to conform with the scalloped underside to create a continuous lower surface of the blended-wing body.

* * * * *